Figure 1:
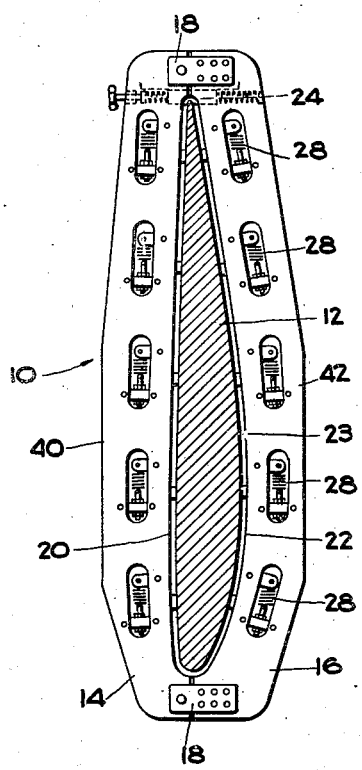

Feb. 5, 1946.    D. C. ROWE    2,394,489
AIRPLANE WING CONTOUR GAUGE
Filed Nov. 2, 1944

INVENTOR
DONALD C. ROWE
BY
Beau, Brooks, Buckley & Beau.
ATTORNEYS

Patented Feb. 5, 1946

2,394,489

UNITED STATES PATENT OFFICE 2,394,489

AIRPLANE WING CONTOUR GAUGE

Donald C. Rowe, Snyder, N. Y., assignor to Bell Aircraft Corporation, Buffalo, N. Y.

Application November 2, 1944, Serial No. 561,570

7 Claims. (Cl. 33—174)

This invention relates to airplane wing contour gauging devices, and more particularly to improved means adapted to be used in airplane factories or the like for checking wing shapes and dimensions so as to check partially or finally fabricated wing panels for contour and twist against the specifications therefor.

It has been previously customary to check finally assembled wing panels for accuracy as to their sectional profile shapes by means of gauge plates having edge portions shaped complementary to the prescribed sectional profile forms of the wings at various stations therealong. Thus, the inspector holds such plates against the wing skin to see whether or not the wing shape complements the curved edge of the test plate. In theory such methods are proper, but in practice they are unsatisfactory because slight local irregularities such as small dents or bumps in the wing skin will inevitably throw such testing plates of the prior art out of kilter with respect to the direction of the general profile shape of the wing. Hence, for example, even though the general profile shape of the wing may be proper, a slight local bump on the skin will hold such a gauge of the prior art out of proper testing position, and no proper test can be conducted.

An object of the present invention is to provide an improved and structurally simple and easily adjustable gauge device which will obviate the difficulties and disadvantages aforesaid. Another object is to provide an improved gauge device for the purpose described, which device is adapted to operate in improved manner and to be independent of local inequalities of the skin of the wing panel being checked. Another object of the invention is to provide an improved gauge device of the character aforesaid, one of the features of which is that it is fully adjustable relative to the wing panel upon which it is to be mounted so as to be "free floating" relative to the wing panel during the mounting operation; whereby the gauge may be mounted in improved manner upon the wing panel to be tested. Other objects and advantages of the invention will appear in the specification hereinafter.

Figure 2:
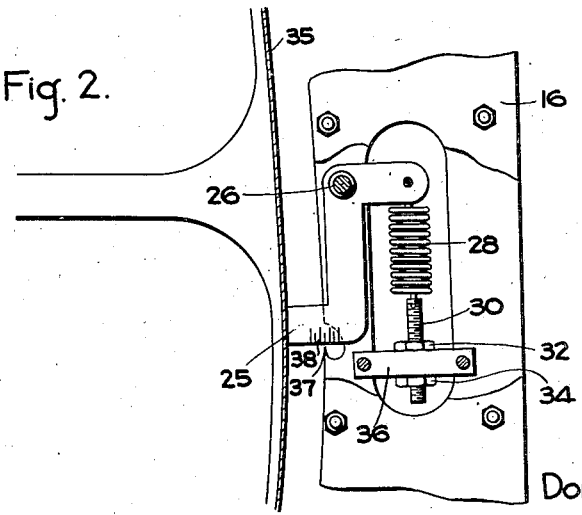

In the drawing:

Fig. 1 is a vertical section through a wing panel standing on edge and showing in elevation a contour gauge of the invention mounted in testing position thereon; and Fig. 2 is a fragmentary view, on a larger scale, of a portion of the gauge device with a section broken away to show the operative elements of a gauging unit thereof.

The present invention contemplates employment of a wing contour checking gauge which embodies a multiple point contacting arrangement whereby a plurality of independent gauge devices are movably mounted upon a baseboard or frame which is shaped to encircle and generally follow the prescribed profile form of the wing being tested while remaining in spaced relation therefrom. The gauge devices thereof are individually spring-pressed so as to tend to protrude into equal pressure bearing relation against the wing panel skin so that the frame carrying the gauge devices tends automatically to float into "centered" or uniformly spaced relation with respect to the wing panel being tested, whereby the curved profile edges of the gauge frame will be equidistantly spaced at all points around the wing profile. Thus, measurements can be taken directly from the inner edge of the gauge frame to the wing skin at any point around the wing profile, so as to permit both general and local checking of the wing contour. Also, two or more of the gauge frame units of the invention may be stationed at intervals spanwise of the wing panel to be checked, in such manner that designated flat edge portions of the gauging frame units are disposed parallel to the corresponding prescribed station chord lines of the wing panel; whereby the gauge units may be employed to check the panel for twist.

The invention is illustrated in the drawing to comprise a contour checking gauge designated generally at 10 and shown in Fig. 1 to be mounted in gauging position upon a typical airplane wing panel 12. The gauge 10 comprises a frame consisting of a pair of plates 14—16 which are each fabricated of sheet metal or the like to form half-link devices adapted to be interconnected at corresponding ends by means of connector plates 18—18 so as to provide altogether a collar-like unit suitable to encompass the wing panel to be checked at a prescribed station for a checking operation. The frame plates 14—16 are shaped at their inner edge portions 20—22, respectively, so as to provide a complete inner profile concentric of and slightly spaced away from the prescribed sectional profile of the wing panel when the gauge frame is accurately "centered" upon the wing panel at the prescribed station for the test. Thus, as illustrated in Fig. 1, when the gauge frame is properly centered about the prescribed station of the wing panel to be tested a gap 23 of uniform width will exist between the gauge frame and the wing skin. A notched block 24 (Fig. 1) is provided to hold the upper end of the gauge frame in proper spaced position above the elevation of the top edge of the wing panel so as to provide the gap 23 to be uniform all around the wing, and the block 24 is preferably biased by opposed springs as shown so as to automatically "center" the frame relative to the wing panel at the top edge thereof.

The gauge frame plates 14—16 are each provided with a plurality of gauging devices, such as is illustrated in more detail in Fig. 2, at intervals perimetrically of the gauge frame. Each gauge device includes an arm 25 in the form of a bell crank pivoted at 26 to the corresponding gauge plate and connected to one end of a tension spring 28. The spring 28 connects at its opposite end to a screw 30 which is threaded through nuts 32—34 arranged to bear at opposite sides against a block 36 which is fixed to the gauge frame plate. Thus, it will be understood that the nuts 32—34 may be adjusted so as to provide equal tensions upon all the springs 28 of the gauge frame unit, whereby the gauge arms 25 will tend to protrude beyond the inner profile edge portions 20—22 of the gauge frame plates and to press with equal pressures against the skin 35 of the wing panel upon which the gauge frame is mounted whenever the gauge frame is properly "centered" upon the wing panel. Preferably, the frame will be formed with indicator fingers as indicated at 37 (Fig. 2) registering with calibrated scales 38 on the fingers 25, whereby variances of the width of the gap between the frame and the wing panel will be directly indicated.

Thus, whenever a gauge frame of the invention is hung upon a wing panel so as to encircle the latter, the springs 28 of the gauge frame actuate the arms 25 to press against the wing skin in such manner as to float the gauge frame into properly centered position relative to the wing panel. As explained hereinabove, the inspector may thereupon measure the distances inwardly toward the wing skin from any inner edge portions of the gauge frame plates so as to check the actual shape of the wing panel against the shape prescribed therefor.

As designated at 40—42 (Fig. 1) the outer edge portions of the frame plates 14—16 may be flattened in parallel relation so as to designate a datum plane or planes to which pluralities of such gauge frames may be mutually aligned so as to provide means for checking a wing panel for twist between stations spaced spanwise of the wing panel. Thus, two or more gauge frames such as illustrated in Fig. 1 may be mounted upon a single wing panel at positions spaced spanwise thereof, and either the corresponding flat side portions 40 or 42 of the gauge frames may be checked by a bubble level or brought into abutting registry with a datum board or wall or the like which has been previously checked to present a true plane surface. Or, in event the wing panel is specified to embody some degree of twist between stations thereon corresponding to the positions of the gauge frames, the datum board may be provided to embody the prescribed degree of twist. Thus, in either case the wing panel mounting the gauge frames may be positioned so that corresponding flattened edge portions of the gauge frames are abutting or adjacent corresponding station positions on the datum board; and if the wing panel fabrication deviates from either the twist or sectional profile shapes prescribed therefor, such deviations will be then readily apparent to an inspector.

It will be appreciated that an important feature and advantage of the gauging method and apparatus of the invention results on the fact that the gauge fingers contact the wing panel skin only at a plurality of spaced point positions, whereby local irregularities of the wing skin will not prevent proper centering of the gauges for accurate checking purposes; and that although only one form of the invention has been shown and described in detail it will be apparent to those skilled in the art that the invention is not so limited and that various changes may be made therein without departing from the spirit of the invention or the scope of the appended claims.

I claim:

1. An airplane wing sectional contour gauge comprising a frame adapted to be positioned to encircle an airplane wing panel, said frame having at one end thereof a notched centering device spring biased to dispose said end of said frame centrally relative to a wing edge portion set into said notched device, and a plurality of centering devices mounted upon said frame, each of said centering devices comprising a wing panel contacting finger movably mounted upon said frame and elastic force means carried by said frame and operably connected to each of said gauge fingers to normally bias the latter to move relative to said frame so as to press against the wing panel to be tested.

2. An airplane wing contour gauge comprising a frame adapted to be positioned adjacent an airplane wing panel, said frame having at one end thereof a notched centering device spring biased to dispose said end of said frame centrally relative to a wing edge portion set into said notched device, and a plurality of spacer devices mounted upon said frame, each of said spacer devices comprising a wing panel contacting arm movably mounted upon said frame and elastic force means carried by said frame and operably connected to each of said arms to normally bias the latter to move relative to said frame so as to press against the wing panel to be tested.

3. An airplane wing shape checking gauge comprising a frame adapted to be positioned adjacent an airplane wing panel, said frame having at one end thereof a notched centering device spring biased to dispose said end of said frame centrally relative to a wing edge portion set into said notched device, and a plurality of centering devices mounted upon said frame, each of said centering devices comprising a wing panel contacting arm movably mounted upon said frame and elastic force means carried by said frame and operably connected to each of said gauge arms to normally bias the latter to move relative to said frame so as to press against the wing panel to be tested, said frame having datum plane designating means thereon adapted for cooperation with other datum means for checking twist alignments of a wing panel.

4. An airplane wing twist checking gauge comprising a frame adapted to be positioned adjacent an airplane wing panel, said frame having at one end thereof a notched centering device spring biased to dispose said end of said frame centrally relative to a wing edge portion set into said notched device, and a plurality of spacer devices mounted upon said frame, each of said spacer devices comprising a wing panel contacting arm movably mounted upon said frame, elastic force means carried by said frame and operably connected to each of said arms to normally bias the latter to move relative to said frame so as to press against the wing panel to be tested, and datum plane designating means carried by said frame for cooperation with other datum means for aligning said frame in wing panel twist checking position.

5. An airplane wing sectional contour gauge comprising a frame adapted to be positioned to encircle an airplane wing panel, said frame having at one end thereof a notched centering device spring biased to dispose said end of said frame centrally relative to a wing edge portion set into said notched device, and a plurality of centering devices mounted upon said frame, each of said centering devices comprising a wing panel contacting finger movably mounted upon said frame and elastic force means carried by said frame and operably connected to each of said gauge fingers to normally bias the latter to move relative to said frame so as to press against the wing panel to be tested, said frame having indicator means thereon and said fingers having scale means thereon in registry with said indicator means.

6. An airplane wing contour gauge comprising a frame adapted to be positioned adjacent an airplane wing panel, said frame having at one end thereof a notched centering device spring-biased to dispose said end of said frame centrally relative to a wing edge portion set into said notched device, and a plurality of spacer devices mounted perimetrically of said frame, each of said spacer devices comprising a wing panel contacting arm movably mounted upon said frame and elastic force means carried by said frame and operably connected to each of said arms to normally bias the latter to move relative to said frame so as to press against the wing panel to be tested.

7. In combination, a plurality of airplane wing gauges each comprising a frame adapted to be positioned adjacent an airplane wing panel, said frames each having at one end thereof a notched centering device spring biased to dispose said end of said frame centrally relative to a wing edge portion set into said notched device, and pluralities of centering devices mounted upon said frame, each of said centering devices comprising a wing panel contacting arm movably mounted upon said frame and elastic force means carried by said frame and operably connected to each of said gauge arms to normally bias the latter to move relative to said frame so as to press against the wing panel to be tested, said frames each having datum plane designating means thereon adapted for cooperation with a common datum base for checking twist alignments of a wing panel mounting said frames.

DONALD C. ROWE.